Sept. 28, 1954      L. HOFFMANN      2,690,317
FISHING ROD HOLDER
Filed Oct. 22, 1951
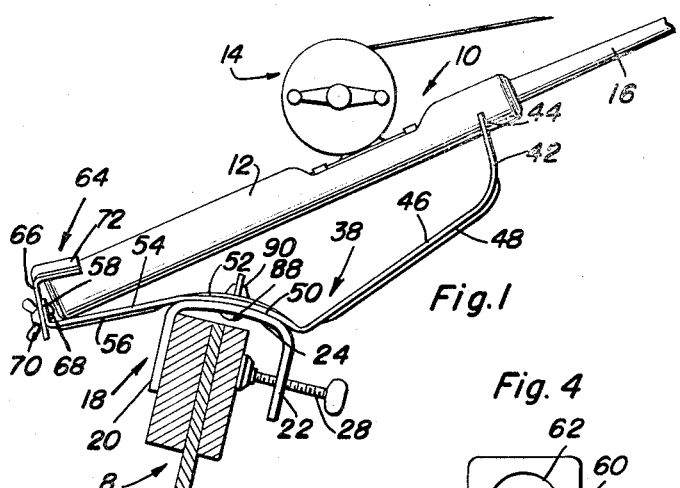
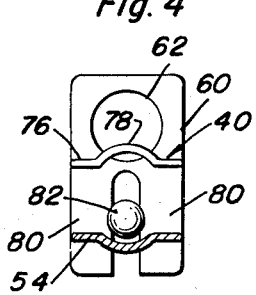
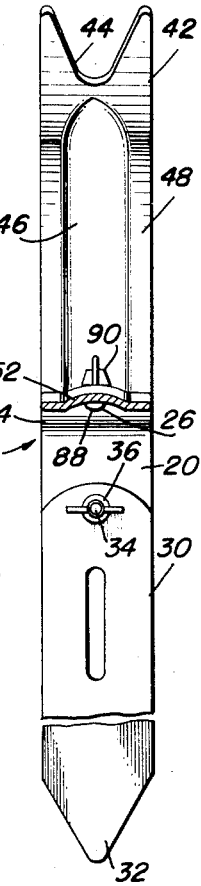
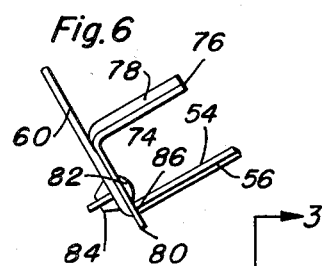
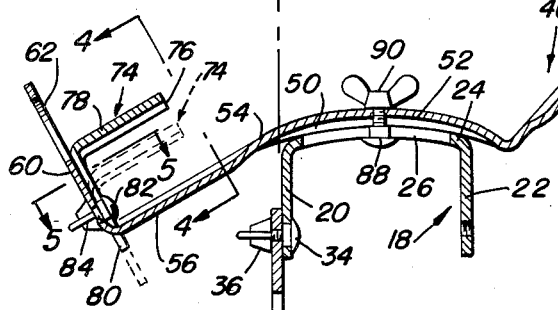
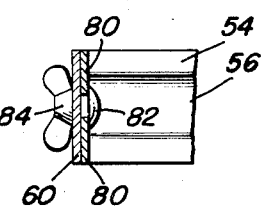
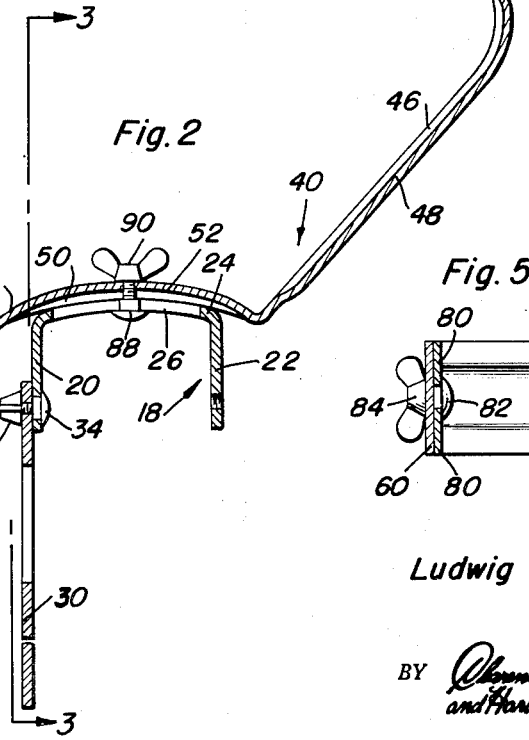
Ludwig Hoffmann
INVENTOR.
BY *Clarence A. O'Brien*
*and Harvey B. Jacobson*
Attorneys

Patented Sept. 28, 1954

2,690,317

UNITED STATES PATENT OFFICE 2,690,317

FISHING ROD HOLDER

Ludwig Hoffmann, Detroit, Mich.

Application October 22, 1951, Serial No. 252,448

1 Claim. (Cl. 248—42)

The present invention has to do with certain new and useful improvements which are aptly and satisfactorily incorporated in holders for fishing rods or poles which are adapted to be anchored on land, fastened on the gunwale of a boat or perhaps to a seat board in the boat, mounted on a wharf or the like.

As in full well evident from the nature of the preceding statement of the invention, fishing pole holders susceptible of accomplishing the various ends stated are old and well known. One may, therefore, size up the general state of the art, broadly, of course, as revealing constructions in which it is old to provide a pole accommodating and holding unit, a clamping unit applicable to a relatively stationary support and adjustable connecting means between the two units whereby a fishing pole may be supported in an upwardly inclined angular position.

It is an object of the present inventoin to structurally, functionally and otherwise improve upon known prior art fish pole holders having the aforementioned facilities, this in a manner to improve upon and reduce the number of structural parts entering into the over-all combination, thereby not only increasing the efficiency of the structure as a whole, but rendering the same les costly to manufacture and to otherwise simplify the requirements in reference to assembling and sale.

Another object of the invention is to provide a significantly distinct fishing pole holder in which manufacturers, retailers and anglers will find their respective needs and requirements fully met and effectually contained and available.

More specifically, it is an object of the invention to provide a pole holder unit of elongated form having its extreme opposite end portions laterally bent and having an arcuate intermediate portion equipped with bolt and nut means whereby same may be perched on and adjustably secured to a complemental clamping unit.

Considered from another point of view, it is an object of the invention to provide a simple U-clamp which is attachable to a boat or other support and which has a curvate and slotted bight portion to accommodate and adjustably cooperate with the bolt-equipped arcuate portion of the holder unit.

Another object of the invention is to provide a holder unit with one lateral end provided with a pole hole and with a novel handle binding clip intimately associable therewith.

Other objects and advantages will become more readily apparent from the following description and the accompanying sheet of illustrative drawings.

Figure 1 is an elevational view showing a fishing pole holder in one of its embodiments and illustrating the manner in which the pole is held and the way in which the holder is fastened on a boat or other support;

Figure 2 is a view which is primarily in section and which has added thereto the ground stake and which has a modified handle securing device at one end;

Figures 3, 4 and 5 are sections taken on the line 3—3, 4—4 and 5—5, respectively, of Figure 2, looking in the directions of the respective sets of arrows; and Figure 6 is a fragmentary elevational view of the left hand end portion of the structure seen in the modification in Figure 2.

Referring now to the drawings and first to Figue 1, the numeral 8 designates a row boat or other support on which the holder for the fishing pole or rod 10 is detachably mounted. The rod is conventional and includes a handle portion 12, reel means 14 and rod 16.

Since the support clamp is the same in both forms of the invention, it is convenient to denote the same by the numeral 18. Said clamp is of general U-shaped form and has lateral limbs or arms 20 and 22 and a curvate bight portion 24 with an elongated slot 26 therein (see Figure 2). In the arrangement seen in Figure 1, there is a setscrew 28 carried by the arm 22 and this serves to clampingly bind the clamp on the gunwale of the boat in a well known manner. This calmp lends itself to attachment to a wharf, to a esat board in a boat or elsewhere. As a matter of fact, it may be fastened on the shoreline. To accomplish this, a simple stake 30 is provided as shown in Figure 2 and the same has a lower pointed end as seen in Figure 3. Using a bolt and nut 34 and 36, the stake may be secured to the arm 20 of the clamp in an obvious manner.

It is also felt that because the pole holder unit 38 in the form of the invention in Figure 1, is nearly the same, except for a detail or two, with the pole holder 40 shown in Figure 2, both units may be described conjointly in this manner. That is to say, each unit is an elongated rigid bar member. One lateral end 42 is bifurcated to provide a fork 44 in which the pole handle is seated in an obvious manner. The adjacent end portion 46 has a longitudinal rib indented therein, as at 48, purely for reinforcing purposes. The intermediate portion 50 is longitudinally bowed to provide a gradual curve or arc and it has an indented rib or flute 52 which is for reinforcing purposes. Incidentally, the arc or curvature of the bend 50 is conformable in a general way with the curvature of the slotted bight portion 24 of the clamp unit 18 or as best shown in Figure 2. The adjacent portion 54 of the bar member also has a reinforcing rib 56. In Figure 1, the left hand end of the bar member has a short lateral bend 58. In the form of the invention seen in Figure 2, the lateral bend 60 is of appreciably greater length and has a hole 62 therein to accommodate an end portion of the fishing rod handle 12.

In the modification of Figure 1, there is an L-shaped clip 64 and one arm 66 thereof has a slot which is slidably super-imposed against the lateral bend 58 and is adjustably secured thereto by a bolt 68 and accompanying wing nut 70. The other end portion of the clip is formed with a curved bead or rib 72 and is opposed to the somewhat similarly curved rib 56 so that the portions 54 and 72 provide a sort of a receiving and holding socket in which the handle portion 12 is securely fastened in the manner shown in Figure 1.

There is a similarly constructed L-shaped clip disclosed at 74 (Figures 2, 4, 5 and 6) and the limb 76 of this has a bend 78 and the other limb is bifurcated and forms fork arms 80—80 which straddle the bolt 82, which is held in place by the nut 84. These arms also are fitted into keeper notches 86, whereby to provide a strong and reliable association of parts. In this adaptation, the clip 74 functions in the same manner as illustrated in Figure 1, but it also cooperates with the hole 62 in that it may be adjusted to function in association with said hole, whereby to clampingly bind the handle 12 in place by inserting in the hole 62 and then binding it in the hole by adjusting the clip 74, in an obvious manner.

In practice, the handle portion of the pole is placed in the holder unit 38 or 40, as the case may be. When thus secured, the fishing rod and unit may be simultaneously adjusted in relation to the clamp unit, this being satisfactorily permitted by the bolt and nut 88 and 90, as illustrated in Figure 2.

It is thought that persons skilled in the art to which the invention relates will be able to obtain a clear understanding of the invention after considering the description in connection with the drawings. Therefore, a more lengthly description is regarded as unnecessary.

Minor changes in shape, size and arrangement of details coming within the field of invention claimed may be resorted to in actual practice, if desired.

Having described the invention, what is claimed as new is:

For use in conjunction with a clamp which latter is adapted to be attached to and supported on a relatively stationary support; a pole holder unit embodying a rigid elongated member provided intermediate its ends with means whereby it may be detachably and adjustably associated with the stated clamp, said member being provided at one end with a fork which is laterally directed and adapted to support the cooperating portion of a pole, said member being provided at its opposite end with a laterally directed terminal portion extending in the same direction as said fork and provided with a hole for reception of an end portion of said pole, the marginal edge portions of the member at its place of juncture with said laterally directed terminal portion having oppositely disposed keeper notches, bolt and nut means mounted on said laterally directed terminal portion in close proximity to the keeper notches, and an L-shaped clip having complemental angular arms, one arm being bifurcated and the bifurcations slidably contacting a cooperating surface of said terminal portion and straddling the shank of the cooperating bolt and occupying a position between the head of the bolt and said cooperating surface and registering with and projecting slidably through the respective keeper notches, the other arm extending laterally from said terminal portion inwardly of the free extremity of the terminal portion and being thus disposed in close proximity to and cooperable with the aforementioned hole and serving to either completely uncover said hole or, alternatively, partially cover and thus decrease the size of the hole in a manner to accommodate poles of varying diameters.

References Cited in the file of this patent

UNITED STATES PATENTS

| Number | Name | Date |
| --- | --- | --- |
| D. 136,856 | Olowecki | Dec. 14, 1943 |
| 263,606 | Smith | Aug. 29, 1882 |
| 374,737 | Geils | Dec. 13, 1887 |
| 1,873,693 | Whitfield | Aug. 23, 1932 |
| 1,876,478 | Van Duzer | Sept. 6, 1932 |
| 2,143,109 | Hadaway | Jan. 10, 1939 |
| 2,236,070 | Rohrdonz | Mar. 25, 1941 |
| 2,530,265 | Phalen | Nov. 14, 1950 |
| 2,576,212 | Carter | Nov. 27, 1951 |